US008652246B2

(12) United States Patent
Antoine et al.

(10) Patent No.: US 8,652,246 B2
(45) Date of Patent: Feb. 18, 2014

(54) COMPOSITION CONTAINING AN ORGANIC FRACTION FOR MAKING A ROAD OR BUILDING LAYER AND/OR COATING

(75) Inventors: Jean-Pierre Antoine, Francheville (FR); Jérôme Marcilloux, Saint-Symphorien d'Ozon (FR)

(73) Assignee: Eiffage Travaux Publics, Neuilly sur Marne (FR)

( * ) Notice: Subject to any disclaimer, the term of this patent is extended or adjusted under 35 U.S.C. 154(b) by 491 days.

(21) Appl. No.: 12/597,165

(22) PCT Filed: Apr. 21, 2008

(86) PCT No.: PCT/FR2008/000556
§ 371 (c)(1),
(2), (4) Date: Oct. 22, 2009

(87) PCT Pub. No.: WO2008/142304
PCT Pub. Date: Nov. 27, 2008

(65) Prior Publication Data
US 2010/0116171 A1    May 13, 2010

(30) Foreign Application Priority Data
Apr. 23, 2007 (FR) ...................................... 07 02927

(51) Int. Cl.
*C09D 193/04* (2006.01)
*C08L 93/04* (2006.01)
(52) U.S. Cl.
CPC ............... *C09D 193/04* (2013.01); *C08L 93/04* (2013.01); *C08L 2666/26* (2013.01)

USPC ................. 106/123.11; 106/123.12; 106/220; 106/229; 524/59; 524/69; 524/70; 524/71

(58) Field of Classification Search
USPC ......... 106/219, 220, 222–235, 240, 241, 242, 106/123.11, 123.13; 524/59, 69, 70, 71
See application file for complete search history.

(56) References Cited

U.S. PATENT DOCUMENTS

| 2,620,319 | A | * | 12/1952 | Rowe et al. | 524/362 |
| 3,556,827 | A | * | 1/1971 | McConnaughay | 106/279 |
| 4,360,615 | A | * | 11/1982 | Wang et al. | 524/9 |
| 5,021,476 | A | | 6/1991 | Pinomaa | |
| 6,469,125 | B1 | * | 10/2002 | Fontana et al. | 528/158.5 |
| 7,303,623 | B2 | * | 12/2007 | Bailey | 106/461 |
| 2004/0260057 | A1 | | 12/2004 | Michel | |
| 2005/0186352 | A1 | * | 8/2005 | Hutter et al. | 427/430.1 |
| 2007/0087213 | A1 | * | 4/2007 | Robinson et al. | 428/541 |

FOREIGN PATENT DOCUMENTS

| EP | 0 514 363 A1 | 11/1992 |
| FR | 2 853 647 A1 | 10/2004 |
| SU | 1 096 268 A | 6/1984 |
| WO | WO 95/18276 | 7/1995 |

OTHER PUBLICATIONS

International Search Report, dated Oct. 29, 2008, corresponding to PCT/FR2008/000556.

* cited by examiner

*Primary Examiner* — David M Brunsman
(74) *Attorney, Agent, or Firm* — Christie, Parker & Hale, LLP

(57) ABSTRACT

A viscous composition for making a layer and/or a coating for a road track or a building, and containing a viscous fraction. The viscous fraction mainly contains vegetable pitch, in particular tall oil pitch, and a phenolic modified rosin.

28 Claims, No Drawings

COMPOSITION CONTAINING AN ORGANIC FRACTION FOR MAKING A ROAD OR BUILDING LAYER AND/OR COATING

CROSS-REFERENCE TO RELATED APPLICATION

This application is a National Phase Patent Application and claims the priority of International Application Number PCT/FR2008/000556, filed on Apr. 21, 2008, which claims priority of French Patent Application Number 0702927, filed on Apr. 23, 2007.

The present invention relates to a viscous composition for producing a road or building layer and/or coating, containing a fraction endowed with viscosity. The invention also relates to a process for producing such a composition.

The expression "endowed with viscosity" is understood to mean a composition capable of existing in a viscous state, for example at certain temperatures or also before drying, even though this composition may, under other temperature conditions, after drying, or after any other conversion or specific chemical reaction, exist in the solid state. In order to simplify the description of the invention, the expression "endowed with viscosity" will be replaced by the qualification "viscous", without however affecting the definition given above.

Such compositions currently contain viscous fractions based on bitumen.

Bitumen is used in a large range of applications. If necessary, additives can be mixed with the bitumen in order to match its characteristics to a particular application.

For example, the road building industry currently uses such compositions, in which the viscous fraction contains mainly bitumen, for the building and maintenance of new roads, including highways, pavements, etc.

Compositions containing bitumen are also widely used as sealing products.

In general, bitumen is used to produce widely differing compositions such as surfacings, coatings, or liquid-tight and air-tight films, which can be used in particular in the building and construction sector and public works.

Although the use of bitumen in order to produce the viscous fraction in compositions is generally perfectly satisfactory, as demonstrated for example by the millions of tons used each year, it nevertheless has numerous disadvantages, which will be discussed hereinafter, and attempts have recently been made to overcome said disadvantages.

Compositions have therefore been proposed that use mainly pine rosins dissolved in a petroleum or vegetable oil.

U.S. Pat. No. 5,021,476 for example discloses a composition for producing an elastic road surfacing. This surfacing consists of a tall oil resin or wood resin, or their derivatives, mixed with mineral or vegetable oils as well as with a polymer.

However, the temperature range in which the composition should be cohesive and thermally resistant then requires the use of several polymers in combination. In particular, it is absolutely essential to use at least one elastomer and a thermoplastic material. The result is high production costs.

In order to overcome this disadvantage FR 2853 647 claims the use of tall oil rosins and their derivatives, in combination with a vegetable oil, and excluding the use of polymers.

The disclosed performances are similar to those of bitumens.

However, tall oil rosins are expensive, which therefore limits the development of this technique.

Furthermore, the production of mixtures of this type produces large amounts of irritant fumes, which pollute in particular the water courses of the factories and production sites, and are harmful to the workforce.

In addition these mixtures have characteristics that evolve over time, with the result that it is particularly difficult to ensure the performances of such mixtures over time. The envisaged solutions of this last problem involve chemical reactions that are practically impossible to control fully, and lead to products that are very different in terms of performance. An excessive hardening of these materials is moreover often found on the production sites.

The invention aims to overcome all the aforementioned disadvantages, in particular the disadvantages associated with the use of bitumen in the production of the viscous fraction of viscous compositions, and the problems encountered with the solutions proposed by the prior art such as mentioned above.

To this end the invention proposes a composition endowed with viscosity for producing a road or building layer and/or surfacing having a fraction endowed with viscosity, in which the said fraction endowed with viscosity comprises mainly wood pitch.

The invention also proposes a process for the preparation of a composition endowed with viscosity for producing a road surface for building layer and/or coating, in which wood pitch is principally used as the said fraction endowed with viscosity.

The use of wood pitch represents an economical solution. This use also enables the problems of fumes to be avoided, and significantly improves the evolution of the product over time.

Optional characteristics of the invention, which are complementary or alternative, are disclosed hereinbelow:

- The said fraction endowed with viscosity comprises mainly wood pitch and at least one additive for regulating physicochemical properties.
- The said fraction endowed with viscosity comprises at least one polymer as regulating additive.
- The said fraction endowed with viscosity comprises between 0.5% and 50%, preferably between 1 and 20%, by weight of the said polymer.
- The said at least one polymer comprises at least one member of the group consisting of polyolefins, polyacrylates, polyacetates, polyunsaturated compounds, polyaromatic compounds, polyamides, polyesters, polyurethanes, epoxy compounds, epoxy derivatives and copolymers, cellulose and its derivatives, starches and polyglycosides, polylactic acids, and natural polyisoprenes.
- The said fraction endowed with viscosity comprises at least one wax as regulating additive.
- The said fraction endowed with viscosity comprises between 0.5% and 20%, preferably between 1 and 10%, by weight of the said wax.
- The said fraction endowed with viscosity comprises at least one member of the group consisting of rosins, rosin derivatives, solid terpenes and derivatives of solid terpenes as regulating additive.
- The said fraction endowed with viscosity comprises between 0.5% and 60%, preferably between 1 and 40%, by weight of the said member.
- The said fraction endowed with viscosity comprises at least one member of the group consisting of fibres as regulating additive.
- The said fraction endowed with viscosity comprises between 1% and 30%, preferably between 2% and 10%, of the said member.

The said fraction endowed with viscosity comprises at least one member from the group consisting of flux oils of petroleum origin, flux oils of carbochemical origin, flux oils of vegetable origin and flux oils of animal origin, as additive.

The said fraction endowed with viscosity comprises between 1% and 40%, preferably between 2% and 25%, by weight of the said member.

The said flux oil comprises at least one member from the group consisting of triglycerides, triglyceride derivatives, tall oil fatty acids and derivatives of tall oil fatty acids.

The said flux oil is unsaturated so as to improve the drying property of the binder.

The said fraction endowed with viscosity comprises a drying additive of an organometallic salt type.

The said metallic salt comprises at least one member of the group consisting of cobalt (Co), vanadium (V), calcium (Ca) and manganese (Mn).

The said fraction endowed with viscosity comprises a mineral charge as additive.

The said fraction endowed with viscosity comprises between 1% and 50%, preferably between 2% and 30%, by weight of the said mineral charge.

The composition additionally comprises solid fragments coated with the said fraction endowed with viscosity.

The said fraction endowed with viscosity comprises mainly tall oil pitch as wood pitch.

At least one additive for regulating physicochemical properties is added to the wood pitch so as to obtain the said fraction endowed with viscosity.

Solid fragments are coated with the said fraction endowed with viscosity.

At least one regulating additive is added after the solid fragments have been coated with the wood pitch.

Solid fragments are coated with the said fraction endowed with viscosity.

At least one regulating additive is added after the solid fragments have been coated with the wood pitch.

The said at least one regulating additive is added to the solid fragments before the said solid fragments are coated.

Other characteristics and advantages of the invention will become apparent on reading the following detailed description.

Tall oil pitch is a residue obtained from the distillation of tall oil. Tall oil pitch consists of a complex mixture of molecules. Tall oil is a by-product of the paper industry.

Tall oil pitch is very different to the other fractions obtained from the distillation of tall oil, such as lighter and heavier fractions, wood essences, tall oil proper, which is often incorrectly called tall oil, and rosins, also called resins.

For further information on this tall oil reference may be made to the document U.S. Pat. No. 5,021,476.

At ambient temperature tall oil pitch is pasty. This differentiates it from rosins, for example, which are solid at this temperature.

Tall oil pitch comprises non-saponifiable fractions, which is not the case with tall oil rosins.

Since tall oil pitch is a distillation residue, it is very cheap, and in particular is much cheaper than tall oil rosins, which can be up to four times more expensive.

The Applicants have found that the characteristics of this pitch are similar to those of a soft bitumen. For example, the cold brittle point of tall oil pitch, as defined by French Standard NF EN 12593, is close to −30° C., and its softening point, as defined by French Standard NF EN 1427, is about 35° C.

These characteristics of the pitch are adapted to its use for the production of a viscous fraction of compositions intended for some of the envisaged applications, such as for example the production of coatings, road surfaces or engineering works in "cold" countries, or also for the production of sealing layers for buried works, regardless of the external temperatures.

However, for other envisaged applications, these characteristics of the pitch, as well as other physicochemical properties, should be adapted, or even regulated, by the use of additives for regulating physicochemical properties.

Interest is directed above all to the production of a binder as viscous composition, comprising mainly tall oil pitch and one or more regulating additives.

The temperature behaviour characteristics of the binder can be regulated by the use of a polymer as additive. It is thereby possible, in particular, to lower the cold brittle point, for example down to −37° C., and to raise the softening point, for example to +70° C., which means that the binder can therefore be used in a broad temperature range.

Such an additive also enables the cohesion characteristics to be influenced. The term cohesion is understood to mean the bulk rupture strength under stress. In this case the use of a polymer as additive enables the cohesion of the binder according to the invention to be significantly increased.

A large number of polymers can be employed. These polymers can if necessary be modified so as to optimise interactions with the other components of the binder, for example by chemical grafting.

Thus, polymers derived from oil can be used, such as polyolefins, polyacrylates, polyacetates, polyunsaturated compounds, polyaromatic compounds, polyamides, polyesters, polyurethanes and epoxy compounds, as well as the derivatives and copolymers of these polymers.

Polymers derived from renewable raw materials, in particular plant-based materials such as cellulose or cellulose derivatives, starches or polyglycosides, polylactic acids, natural polyisoprenes, can be used. Such polymers will preferably be used since they avoid the use of any component derived from oil.

A new polymer or also a recycled polymer can be used, such as for example powdered waste from used tyres. In addition, a plurality of polymers can be used in combination.

The temperature behaviour characteristics of the binder can be regulated by the use of waxes as additive.

The addition of wax enables the softening point of the binder to be raised. The softening point resulting from the addition of wax depends on the melting point of the added wax.

The use of montan, polyolefin, paraffin, vegetable waxes or also amide waxes enables, for example, binders to be obtained whose softening point, measured according to the so-called "ball and ring" method is greater than 80° C.

The use of waxes as additive also enables a possible adhesive characteristic of the binder to be reduced early on. This adhesive characteristic can appear in certain formulations of the binder.

The hardness characteristics of the binder can be regulated by the use of charges as additive.

These regulating charges can reinforce the binder by an essentially physical effect, as is the case where carbon black or also silica is used as charge, or by an essentially chemical effect, for example in the use of slaked lime or quicklime, cement, ash or "Miom" (acronym meaning ash from domestic waste incineration).

Charges can be used as additive in order to give the binder a clearer appearance. Chalk or also titanium oxides, some of which can moreover catalyse pollution-reducing chemical reactions, can for example be used for this purpose.

Charges can in addition be used as additive in order to alter the appearance of the binder. For example, the use of aluminium powder can confer a metallic appearance on the binder, and the use of pigments or colorants changes the colour of the binder.

The use of charges as additive can in addition enable the formulation of the binder and/or its high temperature behaviour, that is to say its softening point, to be regulated.

Finally, the use of charges as additive can moreover enable the dissolution of the binder to be regulated, in particular so as to adjust the cost price of the binder. Chalk, which is very much cheaper than tall oil pitch, can therefore be used to reduce the cost price of the binder.

The use of rosins, terpenes or derivatives of these two types of products as additives enables in addition the hardness of the binder to be regulated. The use of such additives also enables the thermal behaviour of the binder as defined above, that is to say principally its cold brittle point and its softening point, to be regulated.

The binder according to the invention can be produced batchwise, in the sense that the tall oil pitch and the possible additives can be added to a mixer for a certain time, and then transferred to a storage tank.

The binder according to the invention can also be produced in a continuous manner, in the sense that the tall oil pitch and, if appropriate, the various additives, can be added uninterruptedly ("continuously") to a mixer, in which case the binder can then be used immediately.

The binder according to the invention can also be produced in a semi-continuous manner, in the sense that the tall oil pitch and, if necessary, the various additives can be added continuously to a mixer, the binder then finally being obtained after a certain mixing time.

The choice of the process will be influenced by several factors, in particular the amount of binder to be produced, the site for which this binder is intended, the additives used, or also the function of the binder itself.

Regardless of the production process, the tall oil pitch and the possible additives can be added to the mixture in the final proportions of the binder. Alternatively, one or more of these constituents can be added in a concentrated amount and then subsequently diluted, for example in a binder production plant or directly in a surfacing unit. The production of the binder of the invention together with concentrated constituents can in particular enable an intermediate product to be produced whose viscosity is adapted to the formation of granules. The granules are easy to transport and store, and can be diluted, for example in situ, so as to obtain the binder according to the invention.

The binder according to the invention can be used hot, typically at a temperature between about 50° C. and 200° C. It can be sold, stored and/or transported cold, in the form of granules. In particular, these granules can be packed in heat-meltable bags, which can be added directly to a mixer, for example of a coating unit.

The binder according to the invention can be anhydrous. It can also be in the form of an emulsion in water, thanks to the use of emulsifiers, for example anionic, non-ionic, cationic, amphoteric emulsifiers and/or polymers. These emulsifiers can be obtained wholly or in part from the petrochemical industry, or can be renewable, and in particular can be of animal, vegetable or even microbial origin.

The binder according to the invention can advantageously be used for the production of surfacings, such as coatings used as road surfaces, for example.

A surfacing in the form of a viscous composition will now be described, whose viscous fraction consists principally of a binder described above.

In general, the production of a surfacing consists in coating solid fragments with a binder. In this case the binder according to the invention is preferably used, that is to say a binder composed mainly of tall oil pitch and possibly regulating additives.

The expression "solid fragments" is understood here to mean all solid fragments that can be used for the production of surfacings, in particular for road building, comprising in particular natural mineral granular material, and coated aggregates obtained from the recycling of materials recovered during road repair works.

The coating of solid fragments by the binder according to the invention can be carried out by conventional methods. This coating can in addition be carried out in conventional production units, without having to make any modification, in particular structural modification. This represents an advantage of the surfacing according to the invention.

The coating of solid fragments can thus be carried out hot, typically at a temperature between 140° C. and 200° C. In this case the solid fragments are all dry.

The applicants have found however that a particularly appropriate process consists in coating solid fragments heated to a temperature of about 110° C. with the binder according to the invention heated to a temperature above 130° C. The use of the binder according to the invention thus enables the processing temperatures to be considerably reduced, in particular the temperature of the binder and the temperature of the solid fragments. This results in a substantial saving in energy.

The coating of the solid fragments with the binder according to the invention can also be carried out in the presence of water, according to so-called "tepid" or "semi-tepid" processes.

This water can come from components specifically added during the coating and that release water. Alternatively the water can be replaced or supplemented by water from solid fragments that have only been partially dried.

Finally, the coating can be carried out at ambient temperature, typically at about 40° C., in a so-called "cold coating" process. In this case the binder is preferably used in the form of an emulsion.

Regardless of the process used to produce the employed surfacing, the regulating additives present in the binder according to the invention can be added to the tall oil pitch prior to any coating.

These additives can also be introduced during the production of the surfacing. In particular, the additives can be added to the solid fragments before, or after, the introduction of the binder and the coating of these fragments.

This latter process is preferred when fibres are used as additives in order to improve the mechanical properties of the binder, as explained above, and consequently of the surfacing. Mineral fibres can then be used, such as for example glass, carbon or metal fibres, or also organic fibres, such as polyamide, polyester, polyurethane or cellulose fibres. These fibres can be modified, if necessary, in order to improve still further the formulation of the surfacing.

Another preferred application of the binder according to the invention consists in the production of surface coating compositions. The binder according to the invention then advantageously replaces the conventionally used anhydrous bituminous binders and, when it is employed in the form of an emulsion, the conventionally used bituminous emulsions. According to the invention a surface coating is produced by means of the binder according to the invention, on which are arranged solid fragments such as pebbles and small stones.

In order to produce such surface coatings the fluidity of the binder is an essential characteristic feature. This fluidity can be adapted, that is to say most often increased, by using fluidising substances, also called "fluxes", as additives.

Although fluxes of petroleum or carbochemical origin can be used, fluxes of vegetable origin are preferred since they reduce the release of harmful substances and conserve the natural reserves of petroleum.

Tall oil fatty acids or vegetable oils can be used as fluxes. C1 to C4 alkyl esters derived from vegetable oils are preferably used since they have a better softening effect on the binder and consequently on the protective coating, and in particular produce a more effective softening than the said oils.

The vegetable flux that is used will preferably be chosen from vegetable fluxes whose fatty chains are unsaturated. In this way the protective coating will after use quickly have a more solid consistency due to an oxidation reaction termed "siccatisation". The product "Oleoflux 18" (trade name) marketed by the Oleoroute company can therefore be used for this purpose.

This siccatisation can be improved further, more specifically catalysed, by the use of organometallic salts as additive, such as cobalt, vanadium, calcium or also manganese octoates.

All the additives disclosed above can be used individually or in combination, depending on the desired characteristics of the binder, for the production of a binder based on tall oil pitch.

The following table summarises the characteristics of binders obtained from tall oil pitch heated to 160° C., mixed for 3 hours with different additives with the aid of a screw-type mixer, these binders having been cooled and then reheated for 30 minutes at 160° C. before undergoing the various tests.

The binder according to the invention offers a very convenient alternative to the use of bitumen, while overcoming the disadvantages disclosed in the solutions proposed in the prior art. The same is true of the surfacing according to the invention, of the surface coating according to the invention, and more generally of any composition according to the invention.

In fact, the use of bitumen has numerous disadvantages or restrictions.

One of the restrictions on the use of bitumen is its composition, more particularly the presence in its body of so-called "asphaltene" molecules. These molecules consist of a large number of conjugated aromatic rings, which confer on the bitumen its hardness and black colour. This restricts the possibility of using bituminous binders for coloured surfacings, or more generally for surfacings having appearance constraints.

Bitumens are also not very resistant to fuels.

Finally, since they are obtained from the distillation of oil, in which they constitute the heavy fraction, bitumens are not renewable. In addition their use contributes to the depletion of oil reserves, and ultimately to the risk of a shortage of oil. In addition bitumen can, by various catalytic processes, be converted into lighter molecules, and in particular into fuels, so that its use for other purposes increases the said shortage even more. Also, this is all the more damaging as the price of fuels rises while that of the conversion processes drops.

Although the problem of the colour of bitumen is normally solved by the use of synthetic binders, generally obtained by dissolving a polymer in a petroleum oil, this solution does not solve the problem of the non-renewable nature of bitumens. This solution can also be objected to on health and safety grounds since the relevant health and environmental safety labelling is extremely vague.

The problem of the behaviour with respect to fuels has no satisfactory technical solution in health and safety terms; the

|  | Example 1 | Example 2 |
|---|---|---|
| 1. Mass fraction of tall oil pitch supplied by the DRT company. | 90% | 88% |
| Additive(s)  2. a) Mass fraction | 10% | 12% |
| 2. b) Reference | SBS D 116 EM | Elvaloy AM |
| 2. c) Supplier | Kraton | DuPont |
| 3. Dynamic viscosity at 120° C., cone 5 | 13.8 poise | — |
| 4. Penetrability at 25° C. according to NF EN 1426 in tenths of millimetres | 149 ± $\frac{1}{10}$ mm | 144 ± $\frac{1}{10}$ mm |
| 5. Softening point determined by the "ball and ring" method according to NF EN 1427 | 65° C. | 64.8° C. |
| 6. Fraass brittle point according to NF EN 12593 | below −37° C. | below −37° C. |
| 7. Cohesion measured with pendulum ram impact testing machine |  | 0.93 J/cm$^2$ at 30° C. |

|  | Example 3 | Example 4 | Example 5 |
|---|---|---|---|
| 1. | 70% | 82% | 90% |
| 2. a) | 30% | 8%    10% | 9%    1% |
| 2. b) | Sylvaprint HSR 95-150 (*) | SBS D 1192 EM    Resenol 9180 () | Elvaloy AM (*)    Slaked lime |
| 3. | 14.4 poise | 11.64 poise | 10.68 poise |
| 4. | 56 ± $\frac{1}{10}$ mm | 133 ± $\frac{1}{10}$ mm | 196 ± $\frac{1}{10}$ mm |
| 5. | 52.6° C. | 72.6° C. | 61.8° C. |
| 6. | −12° C. | below −32° C. | below −32° C. |
| 7. | 0.97 J/cm$^2$ at 40° C. | 1.07 J/cm$^2$ at 30° C. |  |

(*) modified phenolic rosin ester, ball and ring temperature (BRT) 160° C.
(**) abietic/formaldehyde/phenol resin, BRT 175° C.
(***) ethylene/methyl acrylate copolymer oil tars used up to the present time have been classed as carcinogenic, and are on the point of being phased out.

Finally, a renewable binder implies the development of a product derived from animal, vegetable or microbial raw materials.

The binder according to the invention, and more generally the compositions according to the invention, overcome these disadvantages. In particular, according to the invention coloured and renewable compositions can be obtained, produced without using any product derived from oil, or failing this using only a very small proportion of such products, produced economically and without any danger to the environment, in particular without the release of harmful substances.

The invention covers in a non-limiting manner a binder, a surfacing and a surface coating as well as viscous compositions for producing a road surface or building layer and/or coating having a viscous fraction, mainly comprising tall oil pitch and, if necessary, at least one additive for regulating physicochemical properties. It is understood from the above that the largest fractions, by weight, of the binder according to the invention, of the binder of the surfacing according to the invention, of the binder of the surface coating, and more generally of the viscous fraction of the composition according to the invention, consist of tall oil pitch and optionally additives, in particular those disclosed above. In addition it should be understood that this does not exclude in any way the presence of small amounts, even vanishingly small amounts, by comparison, of other constituents, such as for example impurities or supplementary products, in particular present in the constituents of the binder according to the invention.

The proportions of the additives vary depending on the nature of these additives and the desired range of the regulated physicochemical properties. In certain very specific cases it is not excluded that these proportions will be very small, even vanishingly small.

In the above description of the invention the tall oil pitch has been described as a vegetable pitch. Other vegetable pitches can also be employed. In particular, tall oil pitch has the advantage of being a residue from the paper making industry, which means that this tall oil pitch is available at low cost and in large amounts.

This does not however exclude the use of another type of pitch that is available in larger amounts and/or at lower cost: this vegetable pitch will then possibly be preferred, provided that it meets the physicochemical conditions imposed by the envisaged application.

The invention is not restricted to the embodiments described above, but covers all variants that can be envisaged by the person skilled in the art within the context of the appended claims.

The invention claimed is:

1. A viscous composition for producing a road layer, a building layer or a coating, the viscous composition comprising vegetable pitch and a phenolic modified rosin.

2. The composition according to claim 1, further comprising at least one polymer.

3. The composition according to claim 2 comprising between 0.5% and 50% by weight of the polymer.

4. The composition according to claim 2, wherein the at least one polymer comprises at least one member of the group consisting of polyolefins, polyacrylates, polyacetates, polyunsaturated compounds, polyaromatic compounds, polyamides, polyesters, polyurethanes, polymeric epoxy compounds, derivatives and copolymers of polymeric epoxy compounds, cellulose and its derivatives, starches and polyglycosides, polylactic acids, and natural polyisoprenes.

5. The composition according to claim 2 comprising between 1% and 20% by weight of the polymer.

6. The composition according to claim 1 further comprising at least one wax.

7. The composition according to claim 6 comprising between 0.5% and 20% by weight of the wax.

8. The composition according to claim 6 comprising between 1% and 10% by weight of the wax.

9. The composition according to claim 1 comprising between 0.5% and 60% by weight of the phenolic modified rosin.

10. The composition according to claim 1 further comprising fibres.

11. The composition according to claim 10 comprising between 1% and 30% of the fibres.

12. The composition according to claim 10 comprising between 2% and 10% of the fibres.

13. The composition according to claim 1, further comprising at least one flux oil selected from the group consisting of flux oils of petroleum origin, flux oils of carbochemical origin, flux oils of vegetable origin and flux oils of animal origin.

14. The composition according to claim 13 comprising between 1% and 40% of the flux oil.

15. The composition according to claim 13 wherein the flux oil comprises at least one flux oil selected from the group consisting of triglycerides, triglyceride derivatives, tall oil fatty acids, and derivatives of tall oil fatty acids.

16. The composition according to claim 13 wherein the flux oil is unsaturated.

17. The composition according to claim 13 comprising between 2% and 25% by weight of the flux oil.

18. The composition according to claim 1 further comprising a drying additive comprising an organometallic salt.

19. The composition according to claim 18 wherein the organo metallic salt comprises at least one element selected from the group consisting of cobalt (Co), vanadium (V), calcium (Ca) and manganese (Mn).

20. The composition according to claim 1 further comprising a mineral charge.

21. The composition according to claim 20 comprising between 1% and 50% of the mineral charge.

22. The composition according to claim 20 comprising between 2% and 30% by weight of the mineral charge.

23. The composition according to claim 1 further comprising solid fragments.

24. The composition according to claim 1 wherein the vegetable pitch comprises tall oil pitch.

25. The composition according to claim 1 comprising between 1 and 40% by weight of the phenolic modified rosin.

26. A process for the preparation of a composition for producing a road layer, a building layer, or a coating, comprising coating solid fragments with the viscous composition of claim 1.

27. The process according to claim 26 further comprising the addition of at least one additive after the solid fragments have been coated with the viscous composition.

28. The process according to claim 26 further comprising the addition of at least one additive before the solid fragments are coated with the viscous composition.

* * * * *